US005207530A

United States Patent [19]

Brooks et al.

[11] Patent Number: 5,207,530

[45] Date of Patent: May 4, 1993

[54] UNDERGROUND COMPRESSED NATURAL GAS STORAGE AND SERVICE SYSTEM

[75] Inventors: Gregory L. Brooks, Oklahoma City; Larry W. Zimmer; Allan B. Fullerton, both of Norman; Raymond L. Morris, Oklahoma City, all of Okla.

[73] Assignee: Halliburton Company, Duncan, Okla.

[21] Appl. No.: 922,060

[22] Filed: Jul. 29, 1992

[51] Int. Cl.[5] .................... B65G 5/00

[52] U.S. Cl. .................... 405/53; 405/55; 405/128

[58] Field of Search .................... 405/53, 54, 55, 56, 405/57, 58, 59, 128

[56] References Cited

U.S. PATENT DOCUMENTS

| | | | |
|---|---|---|---|
| 3,309,883 | 3/1967 | Waterman . | |
| 3,352,116 | 11/1967 | Waterman . | |
| 4,117,684 | 10/1978 | Hendrix | 405/54 |
| 4,592,677 | 6/1986 | Washer | 405/59 |
| 4,805,674 | 2/1989 | Knowlton . | |
| 4,818,151 | 4/1989 | Moreland | 405/53 X |
| 4,842,024 | 6/1989 | Hines et al. | 405/53 X |
| 4,921,225 | 11/1990 | Bravo | 405/54 X |

OTHER PUBLICATIONS

Page entitled "ASME Pressure Vessel Assemblies Provide Fast Fill Capability" copied from a brochure published by CPI, Inc.

*Primary Examiner*—Dennis L. Taylor
*Assistant Examiner*—J. Russell McBee
*Attorney, Agent, or Firm*—Dougherty, Hessin, Beavers & Gilbert

[57] ABSTRACT

An underground compressed natural gas ("CNG") storage and service system is disclosed. The system includes a plurality of underground storage containers, a compressor for compressing natural gas, and first conduit means for conducting CNG from the compressor to the storage containers and from the storage containers to a vehicle or other location. In one embodiment, each storage container is an elongated (e.g., 100 feet) string of conventional oil field casing sealed at both ends and positioned in a borehole drilled into the earth. A reinforcing concrete sheath surrounds the casing. A siphon line is disposed within the casing for removing contaminating material that accumulates therein.

Also provided is a method of installing an underground CNG storage apparatus having a predetermined gas volume capacity.

18 Claims, 3 Drawing Sheets

UNDERGROUND COMPRESSED NATURAL GAS STORAGE AND SERVICE SYSTEM

FIELD OF THE INVENTION

In one aspect, the invention relates to storage and service apparatus for compressed natural gas (hereinafter "CNG"). In another aspect, the invention relates to methods of installing storage and service apparatus for CNG.

BACKGROUND OF THE INVENTION

Use of natural gas as a fuel source for motor vehicles is on the rise. Because it burns cleaner, natural gas is less harmful to the environment and better for engines than gasoline and other gaseous fuels. Natural gas is readily available in most parts of the world.

The volume of natural gas required to operate a vehicle for a reasonable driving range is too great for the gas to be practically stored on the vehicle in its normal state. As a result, the gas is compressed into a smaller volume and stored on the vehicle in one or more high pressure gas cylinders. When compressed to a volume that exerts a pressure of 3000 psig, natural gas provides about one-fourth the driving range provided by an equivalent volume of gasoline. Although the volume of natural gas can also be reduced by liquification, the resulting liquified natural gas ("LNG") must be cryogenically stored and involves other complications.

Vehicle CNG storage cylinders can be filled with CNG by either a "slow fill" method or a "fast fill" method. In a slow fill method, natural gas is conducted from a utility gas supply (typically at a pressure of about 5-60 psig) to a compressor. After being compressed by the compressor, the gas is conducted directly into the vehicle storage cylinder. Most of the compressors being used at this time deliver the CNG to the vehicle storage cylinder at a pressure between 3000 and 3600 psig and a rate of about 50 scfm. When full, a typical vehicle storage cylinder (e.g., 10 gallon equivalent) maintains approximately 1025 scf of CNG at a pressure of about 3000 psig.

A disadvantage of slow fill methods is the amount of time required for the vehicle gas cylinder to be filled. The rate CNG is provided to the vehicle gas cylinder is dependent upon the size of the compressor, but for a typical 50 scfm compressor it takes approximately twenty minutes to fill a 10 gallon equivalent gas cylinder. In most applications, compressors capable of delivering CNG at a suitable pressure and at a rate faster than about 50 scfm are cost prohibitive or otherwise not practical. As a result, slow fill methods are generally suitable only for refueling fleet vehicles such as school busses and the like that can be filled overnight.

Fast fill methods allow a typical vehicle storage cylinder (e.g., 10 gallon equivalent) to be filled in three to four minutes. This fill rate is achieved by conducting the CNG to the vehicle storage cylinder at a relatively high rate from one or more storage tanks containing a large volume of CNG at a pressure above the pressure required to fill the cylinder, e.g., above 3000 psig. Several vehicle storage cylinders can be filled at the same time. Fast fill CNG systems generally employ a battery of high pressure cylindrical tanks positioned above the ground. A typical fast fill station maintains approximately 30,000 scf of CNG at a pressure between 3200 and 3600 psig. The storage tanks are usually operated in a sequential manner. For example, when the pressure in one tank approaches equilibrium with the pressure in the vehicle storage cylinder(s) being filled, the system switches to a second tank. Once the pressure in the second tank approaches equilibrium with the pressure in the vehicle storage cylinder(s) being filled, the system switches to a third tank and so forth. The compressor operates to refill the storage tanks as they are depleted.

As the demand for CNG as a fuel source for vehicles increases, more and more fast fill CNG service stations will be needed. In order for CNG to be accessible to the general public, such stations will have to be suitable for installation in residential and other urban areas.

By the present invention, a CNG storage and fast fill service system having greater fast fill capability, increased safety features and improved aesthetics is provided.

SUMMARY OF THE INVENTION

In one aspect, the invention provides underground CNG storage and service apparatus. The apparatus comprises at least one storage container, a compressor for compressing natural gas for storage in the storage container and first conduit means for conducting CNG from the compressor to the storage container and from the storage container to a location separate therefrom. The storage container includes a gas vessel, a reinforcing sheath and a siphon line.

The gas vessel of the storage container has a perimeter wall enclosing an inner cavity. The perimeter wall has a top end, a bottom end and a body portion connecting the top end and bottom end together. The bottom end and at least a substantial portion of the body portion of the perimeter wall are positioned underground. The top end has an opening therein for allowing CNG into and out of the inner cavity.

The reinforcing sheath surrounds the bottom end and the portion of the body portion of the perimeter wall that is positioned underground. In one embodiment, the reinforcing sheath is a layer of cement. The siphon line extends through the top end of the perimeter wall into the inner cavity of the gas vessel for removing water and other contaminating material from the inner cavity.

In one embodiment, the gas vessel of the storage container is a cylindrical tube. The body portion of the perimeter wall of the gas vessel is a unit of conventional oil field casing. This conveniently allows the vessel to be constructed using relatively low cost available materials and installed using well known well drilling equipment and methods. The unit of casing can include one section of oil field casing or two or more sections of oil field casing connected together end to end. In another embodiment, the apparatus includes a plurality of storage containers that operate sequentially to dispense CNG.

In another aspect, the invention provides a method of installing an underground CNG storage apparatus having a predetermined gas volume capacity. The method comprises the steps of:

(a) determining the desired gas volume capacity of the storage apparatus;

(b) drilling a borehole into the earth, the borehole having a depth and diameter sufficient to accommodate the desired gas volume capacity of the storage apparatus;

(c) selecting a unit of oil field casing having a cylindrical outside surface, an inner cavity, an open upper end, an open lower end, a body portion connecting the upper end and the lower end together, and a length and diameter sufficient to accommodate the desired gas volume capacity of the storage apparatus;

(d) sealing the lower end of the unit of casing to prevent CNG from leaking therethrough;

(e) running the unit of casing into the borehole to a depth such that the sealed lower end and at least a substantial portion of the body portion of the unit are positioned underground;

(f) injecting hydraulic cement into the borehole to form a cement sheath between the outside surface of the unit of casing and the wall of the borehole;

(g) positioning a siphon line having a top end and a bottom end in the inner cavity of the unit of casing with the bottom end of the siphon line being positioned adjacent to the sealed lower end of the unit of casing and the top end of the siphon line extending through the upper end of the unit of casing; and (h) sealing the upper end of the unit of casing to prevent CNG from leaking therethrough.

Many advantages are achieved by the invention. Positioning the CNG storage vessel(s) underground increases the safety of the system, improves the aesthetics of the system and conserves valuable space. Because the amount of space available is practically unlimited, the invention allows for a very large volume of CNG to be stored. The underground nature of storage vessel(s) allows the CNG to be stored at a very high pressure, e.g., approximately 5000 psig, which together with the high volume capacity of the vessel(s) vastly improves the fast fill capability of the system. For example, the present invention can achieve the same CNG volume capacity using three underground storage vessels as that achieved by approximately twenty above-ground ASME tubes, which typically hold 10,000 scf of CNG each.

The ability to use conventional oil field casing and well drilling equipment and methods in association with the invention is very convenient and cost efficient. Due to the underground nature of the system, oil field casing can be used even though it is formed of less expensive materials than typical materials used to form above-ground tanks. The ability to use oil field casing and associated well drilling equipment and methods also allows the length and diameter of the gas vessel(s) to be easily varied depending on the CNG volume capacity desired.

It is, therefore, a principal object of the present invention to provide an improved system for storing CNG and servicing vehicles therewith. It is also a principal object of the invention to provide a method of installing an underground CNG storage apparatus having a predetermined gas volume capacity.

Numerous other objects, features and advantages of the present invention will be readily apparent to those skilled in the art upon a reading of the following disclosure including the drawings associated therewith.

DESCRIPTION OF THE PREFERRED EMBODIMENTS

In a first aspect, the invention provides underground CNG storage and service apparatus. In a second aspect, the invention provides a method of installing an underground CNG storage apparatus having a predetermined gas volume capacity.

Figure 1:
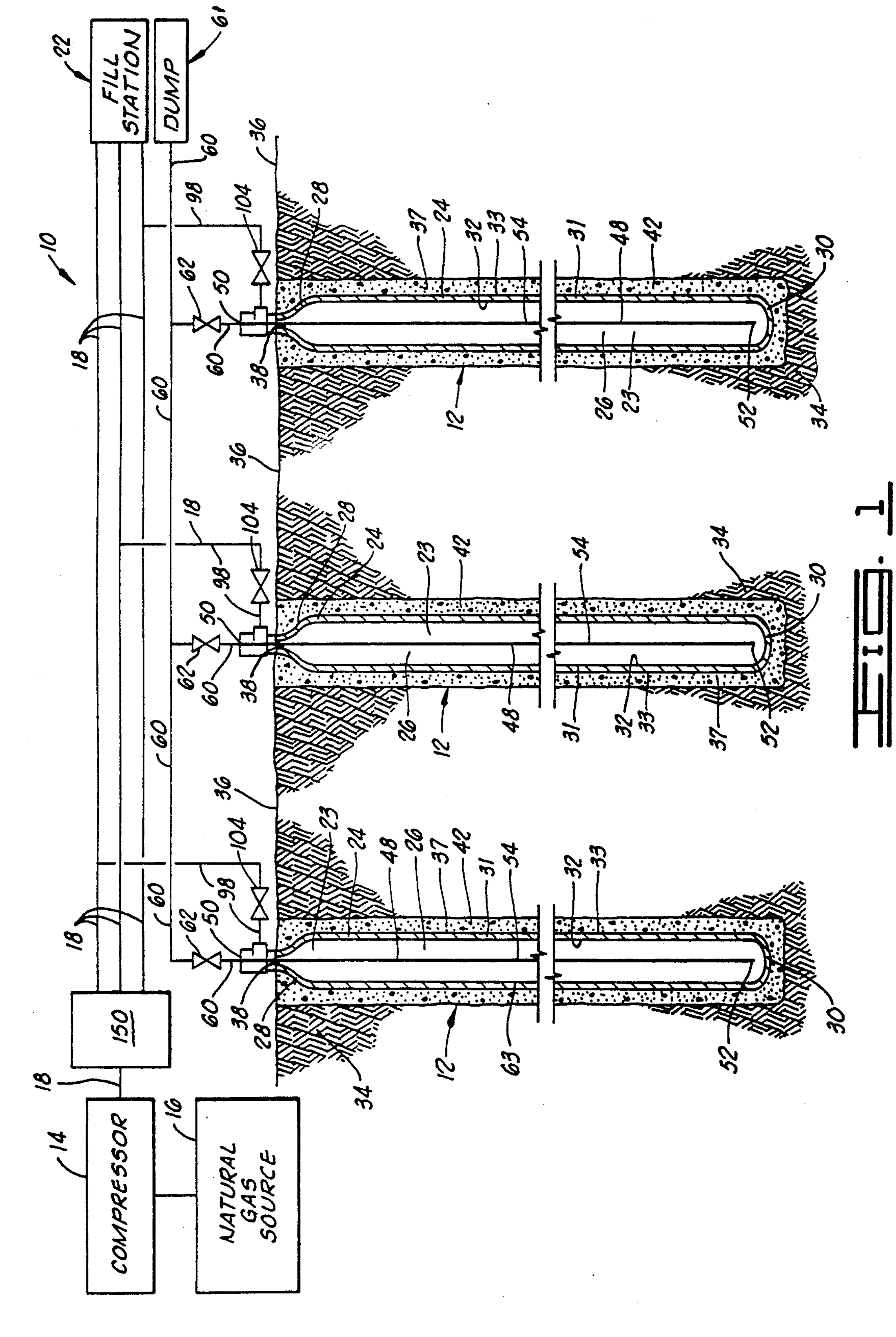
FIG. 1 is a partial schematic view illustrating a preferred embodiment of the underground CNG storage and service apparatus of the present invention.
Figure 2:
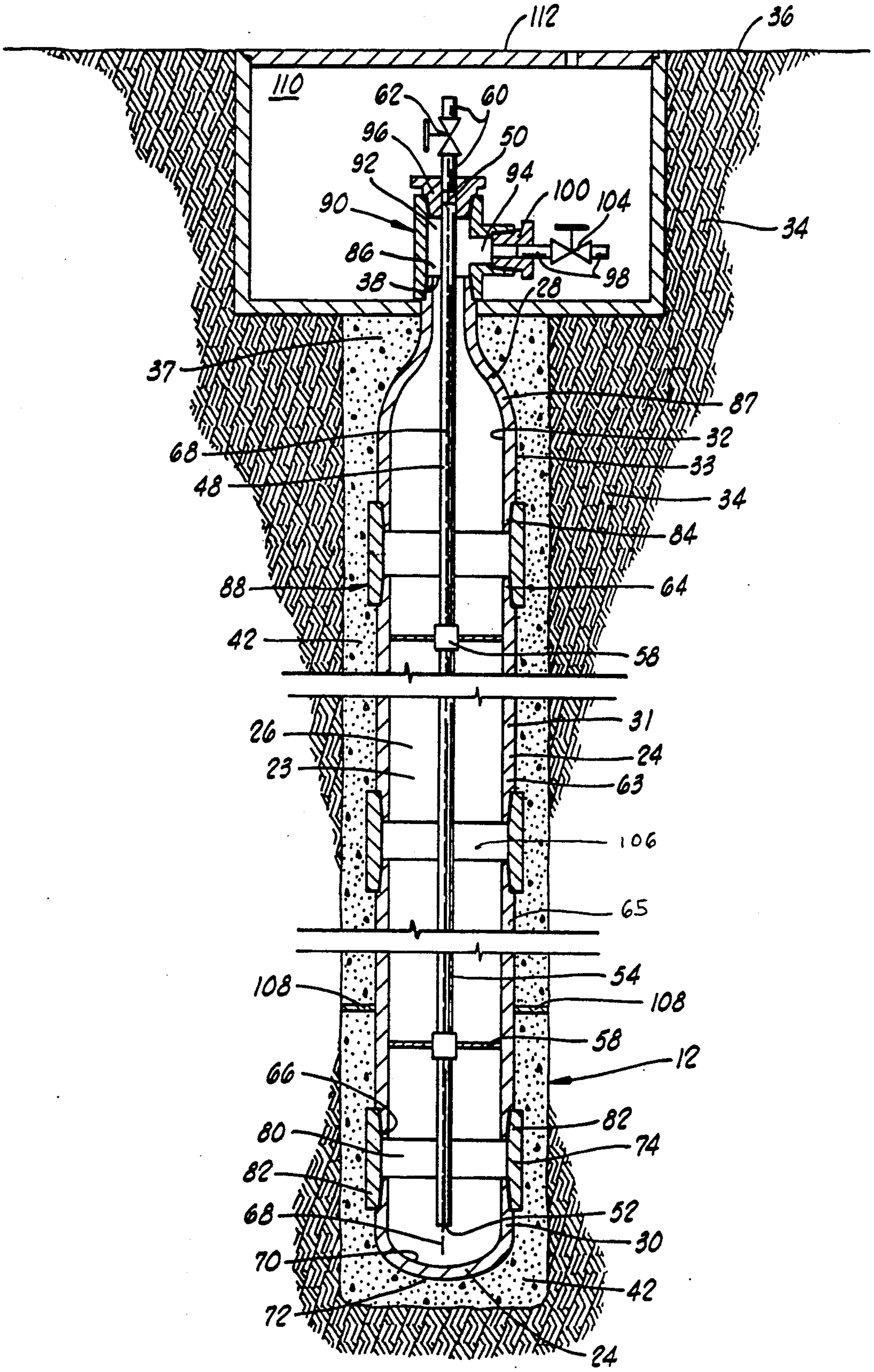
FIG. 2 is an enlarged sectional view of a preferred embodiment of a storage container of the inventive underground CNG gas storage and service apparatus.

Referring now to FIGS. 1 and 2 of the drawings, the inventive CNG storage and service apparatus, generally designated by the reference numeral 10, will be described. The apparatus comprises a plurality of storage containers 12, a compressor 14 for compressing natural gas from a source 16 thereof for storage in the storage containers, and first conduit means including a first conduit 18 for conducting CNG from the compressor to the storage containers and from the storage containers to a fast fill station 22 or other location (e.g., additional storage means) separate from the storage containers.

Each storage container 12 includes a gas vessel 23 having a perimeter wall 24 enclosing an inner cavity 26. The perimeter wall 24 has a top end 28, a bottom end 30, a body portion 31 connecting the top end and bottom end together, an inside surface 32 and an outside surface 33. The bottom end 30 and at least a substantial portion of the body portion 31 are positioned underground, i.e., in the earth 34 under the surface 36 thereof. As used herein and in the appended claims, "at least a substantial portion of the body portion being positioned underground" means that at least 60% of the total length of the body portion is positioned underground. Because the ground provides reinforcement, increases safety and improves aesthetics, preferably approximately 100% of the total length of the body portion 31 is positioned underground. Most preferably, essentially all of the perimeter wall 24 including the body portion 31 and top end 28 thereof is positioned underground. In most applications, it is only necessary to have access to the control valves (discussed below). The gas vessel 23 is preferably positioned in an elongated cylindrical borehole 37 drilled into the earth 34. The top end 28 of the perimeter wall 24 has an opening 38 therein for allowing CNG into and out of the inner cavity 26 of the gas vessel 23.

A reinforcing sheath in the form of a layer of cement 42 surrounds the bottom end 30 and other portion(s) of the perimeter wall 24 of the gas vessel 23 positioned underground. The layer of cement 42 increases the CNG pressure that the gas vessel 23 can withstand without bursting, protects the vessel from corrosion and the environment in general, and protects the environment from the vessel. The layer of cement 42 also bonds the gas vessel 23 to the wall of the borehole or other opening within the earth 34 within which the vessel is positioned. The thickness of the layer of cement can vary as long as a sufficient bond is achieved. Preferably, the layer of cement is about 2 to about 4 inches thick, most preferably about 2 inches thick. If the vessel 23 is positioned within a borehole drilled into the earth 34, the layer of cement 42 should adequately fill the annular space between the outside of the vessel and the wall of the borehole. Any type of cement can be utilized as long as the cement has a sufficient compressive strength. Preferably, the layer of cement 42 is formed using Portland cement, more preferably class H Portland cement.

A siphon line 48 extends through the top end 28 of the perimeter wall 24 into the inner cavity 26 of the gas vessel 23. The siphon line allows water and other contaminating material that accumulates in the bottom of the inner cavity 26 to be removed therefrom. Most above-ground CNG storage tanks include an opening and associated valve on the bottom surface thereof to allow water and other materials to be removed. This is not possible, however, with the inventive storage container because it is buried underground.

The siphon line 48 includes a top end 50, a bottom end 52 and a body section 54 connecting the top end and the bottom end together. The bottom end 52 of the siphon line 48 is preferably positioned between ½ and 2 inches above the inside surface 32 of the bottom end 30 of the perimeter wall 24 of the gas vessel 23 to optimize the ability of the siphon line to drain water and other contaminating material from the inner cavity 26 of the vessel. The siphon line is a cylindrical tube constructed of, for example, schedule 40 pipe. The diameter of the siphon line 48 can vary depending upon the gas volume capacity of the gas vessel 23. Preferably, the siphon line has a diameter of approximately 1 inch. In order to prevent damage to the siphon line 48 and/or gas vessel 23, the siphon line is centered within the inner cavity 26 of the gas vessel by one or more centralizers 58 (shown by FIG. 2). The centralizers 58 are rubber "donut" shaped flat plates perpendicularly extending outwardly from the siphon line 48.

Second conduit means including a second conduit 60 are connected to the siphon line 48 for conducting the water and contaminating material from the siphon line to a separate dump container 61 or other location separate therefrom. First valve means including a first control valve 62 is connected to the second conduit means 60 for regulating the flow of water and other contaminating material into and out of the inner cavity 26 of the gas vessel 23.

As best shown by FIG. 2, the gas vessel 23 of each storage container is cylindrical in shape, preferably in the shape of a cylindrical tube having a longitudinal axis 68. Although the orientation of the gas vessel 23 within the earth is not critical, for ease of installation and other practical reasons, the gas vessel is generally positioned underground such that the longitudinal axis 68 thereof extends into the earth 34 in a substantially vertical direction. As used herein and in the appended claims, "a vertical direction" means a direction toward the center of the earth. The cylindrical shape of the gas vessel 23 is important from a structural standpoint. The cylindrical shape adds strength and integrity to the gas vessel 23 as a whole.

The perimeter wall 24 of the gas vessel 23 including the top end 28, bottom end 30 and body portion 31 thereof can be formed of any material as long as a sufficient structural integrity is ensured for the anticipated working CNG pressure within the vessel (e.g., up to 6000 psig). The thickness of the perimeter wall 24 including the top end 28, bottom end 30 and body portion 31 thereof can also vary somewhat as long as a sufficient structural integrity is ensured. Preferably, the perimeter wall 24 is about 0.9 to about 1.19 inches thick.

The gas vessel 23 can be conveniently constructed in cylindrical tube form using a unit of conventional oil field casing 63 as the body portion 31 of the perimeter wall 24. As used herein and in the appended claims, oil field casing refers to the type of metal piping placed in a well borehole to support the borehole, protect fluids produced through the borehole from contaminants (e.g., brine) and protect the environment (e.g., water table) from fluids produced. A unit of oil field casing refers to either a single section of oil field casing or two or more sections of oil field casing joined together end to end. The unit of oil field casing 63 includes an upper end 64, a lower end 66 and a body section 65 connecting the ends 64 and 66 together. The top end 28 and bottom end 30 of the perimeter wall 24 are attached to the upper end 64 and lower end 66 of the unit of casing, respectively, to complete the perimeter wall and sealingly enclose the inner cavity 26 of the gas vessel 23.

The ability to use conventional oil field casing in constructing the body portion 31 of the perimeter wall 24 of the gas vessel 23 is an important aspect of the invention. This allows the gas volume capacity of the vessel to be easily varied by merely varying the diameter and length of the casing and the associated borehole within which the casing is positioned. It is also very economical in that conventional drilling methods and associated equipment can be used in positioning the gas vessel underground. Conventional oil field cementing methods can be utilized in forming the reinforcing sheath 42 surrounding the gas vessel 23.

The reinforcing sheath 42 and earth 34 surrounding the vessel 23 allow conventional oil field casing to be used as the body portion 31 of the perimeter wall 24. Above ground CNG storage vessels must be made of thicker and/or stronger materials. This is obviously an economic advantage of the invention.

The bottom end 30 of the perimeter wall 24 of the gas vessel 23 is a cylindrical dished end cap having a concave inner surface 70 facing the inner cavity 26 of the gas vessel and an opposing convex surface 72. As with the overall cylindrical shape of the gas vessel 23, the concave/convex structure of the bottom end 30 adds strength and integrity to the vessel as a whole. The bottom end 30 is attached to the body portion 31 of the perimeter wall 24 (attached to the lower end 66 of the unit of casing 63) by an annular reinforcing collar 74. The reinforcing collar 74 comprises an annular ring 80 extending around the body portion 31 (the lower end 66 of the unit of casing 63) and the bottom end 30 of the perimeter wall 24. An annular "O-ring" seal (not shown) extends between the inside surface of the annular ring and the joint between the body portion 31 and bottom end 30 of the perimeter wall 24. Reinforcing flanges 82 are attached to the annular ring 80 and threadingly engage both the body portion 31 (the lower end 66 of the unit of casing 63) and the bottom end 30 of the perimeter wall 24 to hold the body portion and bottom end of the perimeter wall together.

The top end 28 of the perimeter wall 24 of the gas vessel 23 is a reduced diameter end cap having a bottom portion 84, top portion 86 and body section 87 connecting the bottom portion 84 and top portion 86 together. The bottom portion 84 has a diameter equivalent to the body portion 31 of the perimeter wall 24 (the upper end 64 of the unit of casing 63) while the top portion 86 has a diameter substantially smaller than the diameter of the body portion 31 of the perimeter wall. The bottom portion 84 of the top end 28 is attached to the body portion 31 of the perimeter wall 24 (the upper end 64 of the unit of casing 63) by an annular reinforcing collar 88 that is identical in structure and function to the annular reinforcing collar 74. The top portion 86 is open and forms the opening 38 in the top end 28.

A tee connector 90 having a first opening 92 for receiving the siphon line 48 and a second opening 94 for allowing gas to flow into and out of the inner cavity 26 of the gas vessel 23 is attached to the top portion 86 of the upper end 28 of the perimeter wall 24 over and in fluid communication with the opening 38. The siphon line 48 extends into the first opening 92 of the tee connector 90 where it is connected to the second conduit 60. An annular reducer 96 extends between the first opening 92 of the tee connector 90 and the siphon line 48 and second conduit 60 to insure a tight seal. The siphon line 48 and second conduit 60 are threadedly attached to the reducer 96.

A third conduit 98 extends into the second opening 94 for conducting CNG between the inner cavity 26 of the gas vessel 23 and the first conduit means 18. A second annular reducer 100 extends between the second opening 94 of the tee connector 90 and the third conduit 98 to assure a tight seal. The third conduit 98 is threadedly attached to the second reducer 100. Second valve means including a control valve 104 is connected to the CNG conduit 98 to regulate the flow of CNG therethrough. The annular reinforcing collars (e.g., annular reinforcing collars 74 and 88), the tee connector 90, the reducers 96 and 100 and all other components of the gas vessel 23 are made of a material and have a strength sufficient for the gas vessel to withstand the anticipated working CNG pressure within the vessel.

Although it can vary depending upon the gas volume capacity desired and the type of casing and drilling field equipment utilized, the body portion 31 of the perimeter wall 24 of the gas vessel 23 preferably has a diameter of from 6 inches to 14 inches, most preferably 10¾ inches. The oil field casing most preferably used in forming the body portion 31 of the perimeter wall 24 is API standard schedule N80 casing or API standard grade P110 casing. The top portion 86 of the upper end 28 of the perimeter wall 24 preferably has a diameter of about three inches. The reducers 96 and 100 preferably reduce the diameters of the first and second openings 92 and 94 of the tee connector 90 to one inch. This allows standard one inch conduits and associated control valves, pressure gauges and so forth to be utilized.

The overall length of the body portion 31 of the perimeter wall 24 depends on the gas storage capacity desired. A single section of oil field casing can be utilized if a relatively small gas volume capacity is desired. More typically, however, several sections of oil field casing are utilized. The standard length of a section of oil field casing is about 33 feet. As shown by FIG. 2, the sections of casing are connected together end to end with an annular reinforcing collar 106 identical in structure and function t the annular reinforcing collars 74 and 88.

In order to center the gas vessel 23 in the borehole 37, one or more casing centralizers 108 can be placed around the outside surface of the vessel 23 before the reinforcing sheath 42 is constructed. In order to place the tee connector 90, control valve 62, control valve 104 and other components associated therewith below the surface 36 of the earth 34 without restricting access thereto, a cellar 110 or similar arrangement can be utilized. A cellar cover 112 can be placed over the cellar 110. This improves the aesthetics of the system and prevents the control valves and the like from being damaged by moving vehicles, etc. Barrier posts (not shown) can also be placed on the surface 36 around the system to prevent damage thereto. Also, the gas vessel 23 can be cathodically protected from native pipe to soil potentials and stray sources of current which may induce corrosion by grounding the vessel to a deep well anode bed.

Operation of the System

Figure 3:
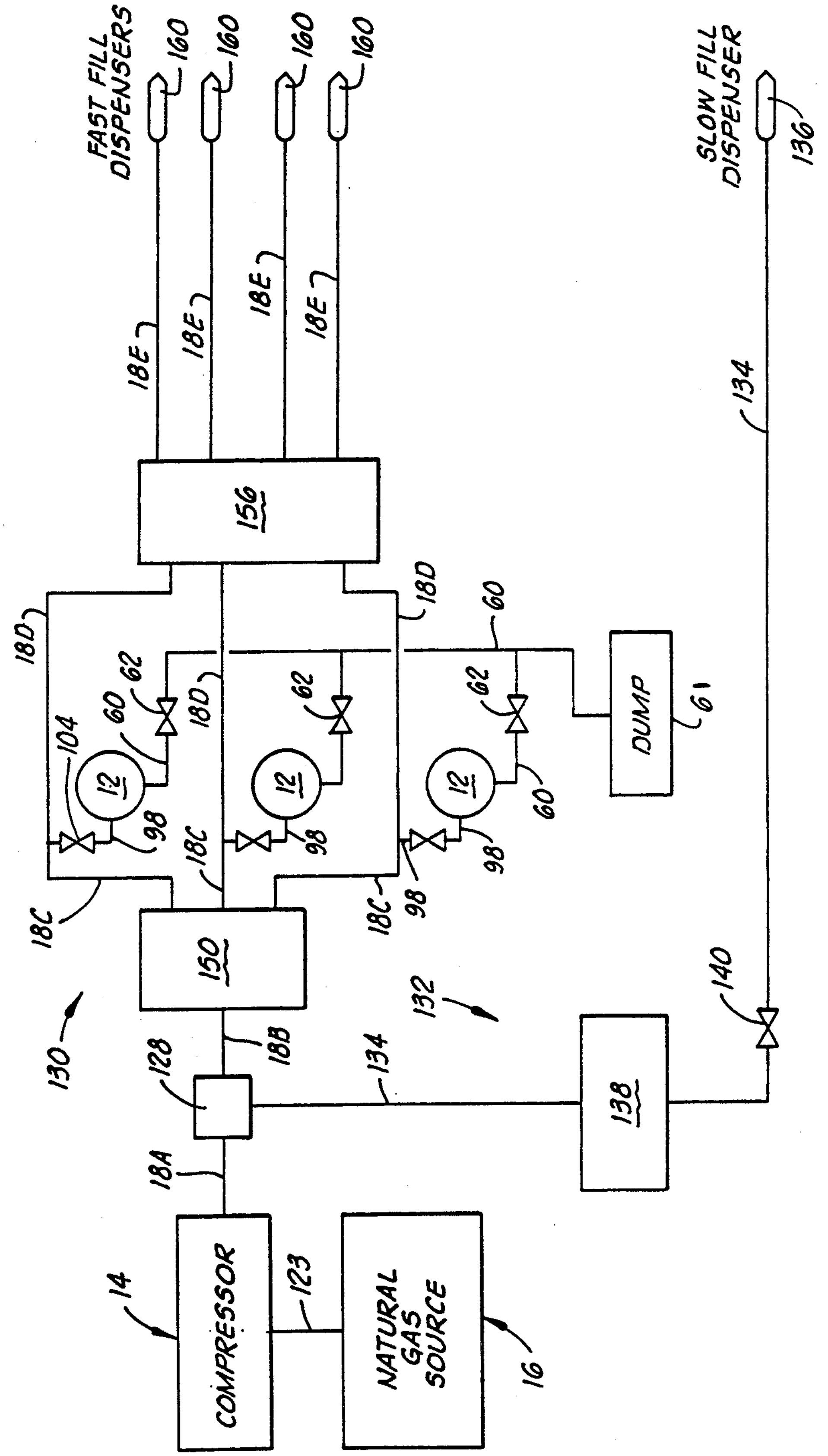
FIG. 3 is a schematic view of a preferred embodiment of the inventive underground CNG storage and service apparatus.

Referring now to FIG. 3, operation of one embodiment of the underground CNG storage and service apparatus of the present invention will be described.

Natural gas is conducted from a source 16 thereof (e.g., a local utility natural gas supply line) through a conduit 123 to the compressor 14. The compressor 14 can be a standard reciprocating-type compressor or other type of compressor suitable for compressing natural gas as known to those skilled in the art.

CNG is conducted from the compressor 14 through a conduit 18A to a valve control box 128. The CNG is conducted from the valve control box 128 to either fast fill apparatus 130 or slow fill apparatus 132.

If conducted to the slow fill apparatus 132, the storage containers 12 of the inventive apparatus 10 are not utilized. Rather, vehicles are filled with CNG using CNG directly from the compressor 14. The CNG is conducted from the valve control box 128 through a conduit 134 to a slow fill dispenser 136 where it is dispensed into a vehicle being serviced. A meter valve 138 and pressure regulator 140 are connected to the conduit 134 for regulating the flow of CNG through the slow fill dispenser 136.

If the fast fill apparatus 130 is utilized, CNG is conducted from the valve control box 128 through a conduit 18B to a priority panel 150. The priority panel regulates the flow of CNG from the compressor 14 to the storage containers 12. The CNG is conducted from the priority panel 150 through conduits 18C to the third conduit 98 of each storage container 12 and into the storage containers. The control valves 104 can be used to isolate the storage containers 12 from the system so that routine checks and maintenance can be performed thereon. The CNG is conducted from the storage containers 12 back through the third conduits 98 into conduits 18D and to a sequential panel 156. The sequential panel 156 regulates the flow of CNG from the storage containers 12 to various fast fill dispensers 160. The CNG is conducted from the sequential panel 156 through conduits 18E to the fast fill dispensers 160. Various pressure sensing and transducing means (not shown) operate to measure the pressure in each container 12, provide representative signals to the priority panel and sequential panel and so forth. The fast fill apparatus 130 allows most vehicles to be filled with CNG in three to four minutes.

Water and other contaminating material in the storage containers 12 are conducted from the siphon line 48 to the second conduit 60 of each storage container and ultimately to the dump container 61 or other location. The first control valves 62 regulate the flow of water and other contaminating materials out of the containers 12.

Although a single storage container can be utilized, more than one storage container is preferred to provide for sequential operation. The system is most efficient when at least three storage containers 12 are utilized. The sequential panel 156 controls the flow of CNG from the storage containers in a sequential manner to insure that a CNG pressure above the 3000 psig or other minimum pressure required to fill typical vehicle storage cylinders is always available. For example, vehicles are first filled with CNG from one of the storage containers 12. If the CNG pressure in this container is below the CNG pressure in a vehicle storage cylinder or approaches equilibrium therewith before the vehicle is filled to the required pressure, the sequential panel sequences to a second storage container 12. The second storage container 12 then fills the vehicle storage cylinder to a pressure of, for example, 3000 psig. If the pressure in the second storage container approaches equilibrium with the CNG pressure in a vehicle storage cylinder before the vehicle is filled to the required pressure, the sequential panel sequences to the third storage container 12. The compressor 14 continuously fills the storage containers 12 with priority set for the highest pressure storage container within the sequence to assure that a pressure sufficient to fill the vehicles is always present when the system is operating. The priority panel 150 prioritizes the flow of CNG to the various storage containers 12.

As will be understood by those skilled in the art, the particular types of conduits, control valves, pressure sensing and transducing means dispensers and overall control instrumentation utilized will vary depending upon the particular type of system set up.

Installation of the Storage Containers

The storage containers of the inventive underground CNG storage and service apparatus are preferably installed using conventional well drilling equipment and techniques. The following method is utilized.

First, the gas volume capacity needed for each storage container is determined. For example, if a total storage capacity of 200,000 scf of CNG is needed, three storage containers that each hold approximately 67,000 scf of CNG are utilized.

Next, a borehole for each storage container is drilled into the earth. The borehole is drilled to a depth and with a diameter sufficient to accommodate the predetermined gas volume capacity of the storage container. For example, in order to accommodate a storage container 100 feet long having a $10\frac{3}{4}$ inch diameter (sufficient to hold approximately 67,000 scf of CNG), the borehole is preferably drilled to a depth of approximately 100 feet and with a diameter of approximately $14\frac{3}{4}$ inches. Conventional well drilling equipment can be utilized. For example, to drill boreholes up to 100 feet in depth, conventional water well drilling and/or oil field "rat-hole rigs" can be utilized.

Next, a unit of oil field casing that has a length, diameter, wall thickness and overall strength sufficient to accommodate the predetermined gas volume capacity of the storage container at the anticipated working CNG pressure therein (e.g., up to 6000 psig) is selected. The unit of oil field casing will most typically consist of several sections of oil field casing. Each section is connected together end to end using annular reinforcing collars as described above as the casing is run into the borehole.

Prior to placing the unit of casing into the borehole, the lower end of the first section of casing to be placed into the borehole is sealed by placing a dished end cap as described above thereon to prevent CNG from leaking therethrough.

The casing is then run into the borehole by conventional methods to a depth such that at least a substantial portion of the overall unit of casing is positioned in the borehole. As used herein and in the appended claims, at least a substantial portion of the overall unit of casing means approximately 60% of the total length thereof. As discussed above, preferably the entire overall unit of casing is positioned in the borehole.

Hydraulic cement is then injected into the borehole to form the reinforcing sheath between the outside surface of the unit of casing and the wall of the borehole. This can be accomplished in various ways. In accordance with a "puddle" method, the cement is pumped into the borehole before the casing is run. The casing is lowered into the cement. Although this procedure typically gives the best overall cement job, it is sometimes difficult to use due to a piston-like displacement of the column of cement. In a second method, cement injection tubes can be run down between the casing and the wall of the hole and used to inject cement between the casing and the wall of the hole from the bottom up. A disadvantage of this method is incomplete cement coverage due to the flow area of the cement over the tubes.

Next, the siphon line is installed in the inner cavity of the unit of casing. The bottom end of the siphon line is preferably positioned between $\frac{1}{2}$ and 2 inches from the bottom end of the gas vessel. The top end of the siphon line extends through the upper end of the unit of casing.

The upper end of the unit of casing is then sealed to prevent CNG from leaking therethrough by placing a reduced diameter end cap, tee connector, conduits and control valves as described above thereon. The gas vessel is tested for leaks by pressure testing either with water or nitrogen gas. Preferably, nitrogen gas is injected into the vessel to a pressure exceeding 6000 psig and the pressure is held to check for leaks.

The remaining components of the inventive underground CNG storage and service apparatus can be installed by various methods as known to those skilled in the art.

Although certain preferred embodiments of the invention have been described for illustrative purposes, it will be appreciated that various modifications and innovations of the apparatus and method recited herein may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. Underground compressed natural gas storage and service apparatus comprising:

at least one storage container including:

a gas vessel having a perimeter wall enclosing an inner cavity, said perimeter wall having a top end, a bottom end and a body portion connecting said top end and said bottom end together, said bottom end and at least a substantial portion of said body portion being positioned underground, said top end having an opening therein for allowing compressed natural gas into and out of said inner cavity;

a reinforcing sheath surrounding said bottom end and said portion of said body portion of said perimeter wall being positioned underground; and a siphon line extending through said top end of said perimeter wall into said inner cavity of said gas vessel for removing contaminating material from said inner cavity;

a compressor for compressing natural gas for storage in said storage container; and first conduit means for conducting compressed natural gas from said compressor to said storage container and from said storage container to a location separate therefrom.

2. The apparatus of claim 1 wherein said reinforcing sheath is a layer of cement.

3. The apparatus of claim 1 wherein said gas vessel is a cylindrical tube.

4. The apparatus of claim 3 wherein said body portion of said perimeter wall of said gas vessel is a unit of oil field casing.

5. The apparatus of claim 4 wherein said unit of oil field casing includes at least two sections of oil field casing connected together end to end.

6. The apparatus of claim 5 wherein said sections of oil field casing are connected together by an annular reinforcing collar, said reinforcing collar extending around a portion of each section.

7. Underground compressed natural gas storage and service apparatus comprising:

a plurality of storage containers, each container including:

a gas vessel having a perimeter wall enclosing an inner cavity, said perimeter wall having a top end, a bottom end and a body portion connecting said top end and said bottom end together, said bottom end and at least a substantial portion of said body portion being positioned underground, said top end having an opening therein for allowing compressed natural gas to flow into and out of said inner cavity;

a reinforcing sheath surrounding said bottom end and said portion of said body portion of said perimeter wall being positioned underground; and a siphon line extending through said top end of said perimeter wall into said inner cavity of said gas vessel for removing contaminating material from said inner cavity;

a compressor for compressing natural gas for storage in said storage containers; and first conduit means for conducting compressed natural gas from said compressor to said storage containers and from said storage containers to a location separate therefrom.

8. The apparatus of claim 7 wherein said reinforcing sheath of each of said storage containers is a layer of cement.

9. The apparatus of claim 7 wherein said gas vessel of each of said storage containers is a cylindrical tube.

10. The apparatus of claim 9 wherein said body portion of said perimeter wall of said gas vessel is a unit of oil field casing.

11. The apparatus of claim 10 wherein said unit of oil field casing includes at least two sections of oil field casing connected together end to end.

12. The apparatus of claim 11 wherein said sections of said unit of oil field casing are connected together by an annular reinforcing collar, said annular reinforcing collar extending around a portion of each section.

13. The apparatus of claim 7 wherein each of said storage containers further comprises:

second conduit means for conducting said contaminating material from said siphon line to a location separate therefrom; and first valve means connected to said second conduit means for regulating the flow of contaminating material into and out of said inner cavity through said siphon line.

14. The apparatus of claim 7 wherein said apparatus comprises three of said storage containers.

15. A method of installing an underground compressed natural gas storage apparatus having a predetermined gas volume capacity comprising:

determining the desired gas volume capacity of the storage apparatus;

drilling a borehole into the earth, said borehole having a depth and diameter sufficient to accommodate the desired gas volume capacity of the storage apparatus;

selecting a unit of oil field casing having a cylindrical outside surface, an inner cavity, an open upper end, an open lower end, a body portion connecting said upper end and said lower end together, and a length and diameter sufficient to accommodate the desired gas volume capacity of the storage apparatus;

sealing said lower end of said unit of casing to prevent compressed natural gas from leaking therethrough;

running said unit of casing into said borehole to a depth such that said sealed lower end and at least a substantial portion of said body portion of said unit are positioned underground;

injecting hydraulic cement into said borehole to form a cement sheath between said outside surface of said unit of casing and the wall of said borehole;

positioning a siphon line having a top end, a bottom end and a body section connecting said top end and bottom end of said siphon line together in said inner cavity of said unit of casing with said bottom end of said siphon line being positioned adjacent to said sealed lower end of said unit of casing and said top end of said siphon line extending through said upper end of said unit of casing; and sealing said upper end of said unit of casing to prevent compressed natural gas from leaking therethrough.

16. The method of claim 15 wherein said unit of casing comprises at least two sections of oil field casing connectable together end to end.

17. The method of claim 16 further comprising connecting said sections of oil field casing together end to end with an annular reinforcing collar that extends around a portion of each section.

18. The method of claim 15 further comprising the step of after sealing said upper end of said unit of casing, injecting nitrogen gas into said inside cavity of said unit of casing to check said cavity for leaks.

* * * * *